United States Patent
Haruyama et al.

(10) Patent No.: US 9,229,273 B2
(45) Date of Patent: Jan. 5, 2016

(54) REFLECTION TYPE LIQUID CRYSTAL DEVICE HAVING A TILT MECHANISM AND LCD PROJECTOR

(75) Inventors: Akihide Haruyama, Suwa (JP); Osamu Okumura, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 723 days.

(21) Appl. No.: 13/020,108

(22) Filed: Feb. 3, 2011

(65) Prior Publication Data
US 2011/0194057 A1  Aug. 11, 2011

(30) Foreign Application Priority Data
Feb. 10, 2010 (JP) ................. 2010-027321

(51) Int. Cl.
*G02F 1/13363* (2006.01)
*G02F 1/1335* (2006.01)
*G02F 1/01* (2006.01)
*G02F 7/00* (2006.01)
*H04N 9/31* (2006.01)

(52) U.S. Cl.
CPC ........ *G02F 1/133634* (2013.01); *H04N 9/3141* (2013.01); *H04N 9/3197* (2013.01); *G02F 1/133553* (2013.01); *G02F 2413/01* (2013.01); *G02F 2413/08* (2013.01); *G02F 2413/11* (2013.01)

(58) Field of Classification Search
USPC ........................................... 349/117
See application file for complete search history.

(56) References Cited

U.S. PATENT DOCUMENTS

| 2006/0050215 A1 | 3/2006 | Haruyama |
| 2006/0268207 A1* | 11/2006 | Tan et al. ................. 349/117 |
| 2008/0100759 A1 | 5/2008 | Tateno |
| 2009/0290108 A1 | 11/2009 | Nakagawa et al. |

FOREIGN PATENT DOCUMENTS

| EP | 1762883 A1 | 3/2007 |
| JP | 2008-164754 A | 7/2008 |
| JP | 2009-37025 A | 2/2009 |
| JP | 2009229084 A | 10/2009 |
| JP | 2009229804 A | 10/2009 |

OTHER PUBLICATIONS

EP Search Report for EP11153800, mailed May 4, 2011.

* cited by examiner

*Primary Examiner* — Lauren Nguyen
(74) *Attorney, Agent, or Firm* — Hauptman Ham, LLP

(57) ABSTRACT

A reflection type liquid crystal device has: a liquid crystal cell held between a pair of substrates and an optical compensation plate disposed outside the pair of substrates. The optical compensation plate has a first optical axis along the thickness direction thereof. The liquid crystal cell has a pretilt at which a second optical axis of a liquid crystal molecule of the liquid crystal cell is inclined with respect to a plate surface of the liquid crystal cell. The optical compensation plate is tiltable in a first direction in which a standard angle becomes larger, wherein the standard angle is defined as an acute angle between the first optical axis and the second optical axis when the optical compensation plate is located parallel to the plate surface of the liquid crystal cell.

14 Claims, 11 Drawing Sheets

REFLECTION TYPE LIQUID CRYSTAL DEVICE HAVING A TILT MECHANISM AND LCD PROJECTOR

RELATED APPLICATIONS

The instant application claims the benefit of Japanese patent application No. 2010-027321 filed Feb. 10, 2010 the entire disclosure of which is incorporated by reference herein.

BACKGROUND

1. Technical Field

The present disclosure relates to a reflection type liquid crystal device (LCD) and a projector.

2. Related Art

In recent years, the contrast of liquid crystal projectors has been improved, and the VA (vertical alignment) liquid crystal material has increasingly replaced the TN (twisted nematic) liquid crystal material. The VA liquid crystal material has a high contrast in the direction perpendicular to the LCD panel and, in addition, can obtain a large viewing angle by simple viewing angle compensation. When the viewing angle becomes large in a projector, the contrast in the angle range taken into the projection lens improves, thereby increasing the contrast of projected images.

The VA liquid crystal material for use in a liquid crystal television and the like is usually structured to obtain a high contrast in a wide viewing angle range by combining an optical compensation plate (a so-called C plate). In contrast, such viewing angle compensation cannot be achieved in a VA liquid crystal panel for use in a liquid crystal projector. This is because the light bulb has extremely high definition, and thus an orientation controller (a projection or an electrode opening) adopted in a liquid crystal television cannot be built in a minute pixel, which inevitably results in that the orientation is controlled by tilting (pretilt) the VA liquid crystal at several angles from the vertical state. Even when the VA liquid crystal having such a pretilt is tried to compensate by the C plate, a phase difference remains in the direction perpendicular to the liquid crystal panel, and thus high contrast cannot be obtained.

Japanese Unexamined Patent Application Publication No. 2008-164754 discloses a technique in which the C plate and an optical compensation plate (a so-called O plate) having an optical axis which tilts with respect to the element surface are combined, and the viewing angle characteristics are compensated for by disposing the C and O plate combination on the external surface of the liquid crystal panel, so that high contrast and wide viewing angle characteristics are obtained. Moreover, Japanese Unexamined Patent Application Publication No. 2009-37025 discloses a technique in which the C plate is disposed in a tilted state on the outside of a transmission type VA liquid crystal panel so that the optical axis of the liquid crystal panel and the optical axis of the C plate are parallel to each other, and the front phase difference of the VA liquid crystal is compensated for only with the C plate.

It is also considered that the above-described optical compensation plate is adapted to a reflection type VA liquid crystal panel. However, when the technique of Japanese Unexamined Patent Application Publication No. 2008-164754 is employed, two expensive optical compensation plates are required, resulting in a cost increase. According to the technique of Japanese Unexamined Patent Application Publication No. 2009-37025, there is a possibility that the C plate is adhered to the liquid crystal panel in a state where the tilt direction of the C plate shifts due to the attachment error or the like caused by an attachment jig. Moreover, there is also a possibility that the C plate is formed with a shift between the plate surface and the optical axis due to an error in manufacturing the C plate. Furthermore, there is also a possibility that the azimuth angle of the liquid crystal orientation shifts in the VA liquid crystal panel.

When variations in the optical conditions, such as the shift in the tilt direction or the shift in the liquid crystal orientation, occur, high contrast is difficult to obtain in some cases even when the C plate is disposed in a tilted state on the external surface of a reflection type VA liquid crystal panel so that the optical axis of liquid crystal molecules and the optical axis of the C plate are parallel to each other.

SUMMARY

An advantage of some aspects of the invention is to provide a reflection type liquid crystal device and a projector that can achieve an increase in contrast irrespective of the variations in the optical conditions, such as an individual difference of a liquid crystal panel or an installation shift in an optical compensation plate.

A reflection type liquid crystal device in accordance with one or more embodiments of the invention has: a pair of substrates, an optical compensation plate disposed outside the pair of substrates, a liquid crystal cell held between the pair of substrates, and a tilt mechanism. The optical compensation plate has a negative refractive-index anisotropy, and a first optical axis along the thickness direction thereof. The liquid crystal cell has a pretilt at which a second optical axis of a liquid crystal molecule of the liquid crystal cell is inclined with respect to a plate surface of the liquid crystal cell. The tilt mechanism is arranged for tilting the optical compensation plate relative to the liquid crystal cell in a first direction in which a standard angle becomes larger. The standard angle is defined as an acute angle formed between the first optical axis and the second optical axis when the optical compensation plate is located parallel to the plate surface of the liquid crystal cell.

Since the reflection type liquid crystal device can tilt the optical compensation plate also in the first direction opposite to a direction in the case of a transmission type liquid crystal device, wide optical compensation suppressing variations in the optical conditions, that have been difficult to sufficiently compensate for simply by tilting in one direction can be achieved, although there is a high possibility that a shift in the axis of rotation in a tilt jig of the optical compensation plate, a shift in the orientation direction of the liquid crystal molecule, a shift in the plate surface and the optical axis in the optical compensation plate, or the like may occur in practical use. Therefore, a high contrast display can be obtained also in the case where variations in the optical conditions occur.

It is preferable in some embodiments of the reflection type liquid crystal device that the axis of rotation that tilts the optical compensation plate be disposed on the plate surface of the optical compensation plate and the pretilt direction of the liquid crystal cell and the slow axis direction formed from the tilted optical compensation plate be substantially orthogonal to each other.

According to the structure, by tilting the optical compensation plate in the first direction, the pretilt direction of the liquid crystal cell and the slow axis direction formed from tilting the optical compensation plate are substantially orthogonal to each other, and by compensating for a phase difference between the liquid crystal cell and the optical compensation plate, a high contrast display can be obtained.

It is preferable in further embodiments of the reflection type liquid crystal device that the axis of rotation that tilts the optical compensation plate be not disposed on the plate surface of the optical compensation plate but disposed at a shifted position, and the azimuth angle direction of the optical axis of the optical compensation plate to be tilted crosses the azimuth angle direction of the pretilt of the liquid crystal cell.

When the axis of rotation is not disposed on the plate surface of the optical compensation plate (the optical compensation plate is disposed in a shifted state in a rotation holding mechanism), the direction of the optical axis (second optical axis) of the liquid crystal molecule and the direction of the slow axis formed from rotating the optical compensation plate can be made substantially orthogonal to each other depending on the direction of rotating the optical compensation plate. More specifically, the optical compensation plate has the optimal rotation direction.

When one or more embodiment of the invention is adopted, the optical compensation plate can be tilted in the first direction opposite to the tilting direction previously used for transmission type VA LC panels. Therefore, a phase difference caused by the liquid crystal cell can be favorably compensated for in such a case.

It is also preferable in some embodiments of the reflection type liquid crystal device that the optical compensation plate can be tilted also in a second direction in which the angle of the standard angle becomes small and the tilt can be continuously adjusted in the first direction and the second direction.

According to the structure, since the tilt angle of the optical compensation plate can be continuously adjusted in the first direction and the second direction, the compensation capability provided by the optical compensation plate can be increased.

A projector has the reflection type liquid crystal device described above is also provided.

Since the projector has the reflection type liquid crystal device that can achieve an increase in contrast even when variations in the optical conditions occur, a projector having high display quality and high reliability can be provided.

BRIEF DESCRIPTION OF THE DRAWINGS

Exemplary embodiments will be described with reference to the accompanying drawings, wherein like numbers reference like elements.

DESCRIPTION OF EXEMPLARY EMBODIMENTS

Hereinafter, exemplary embodiments of the invention will be described with reference to the drawings which are for illustrative purposes only and are not to scale.

Figure 1:
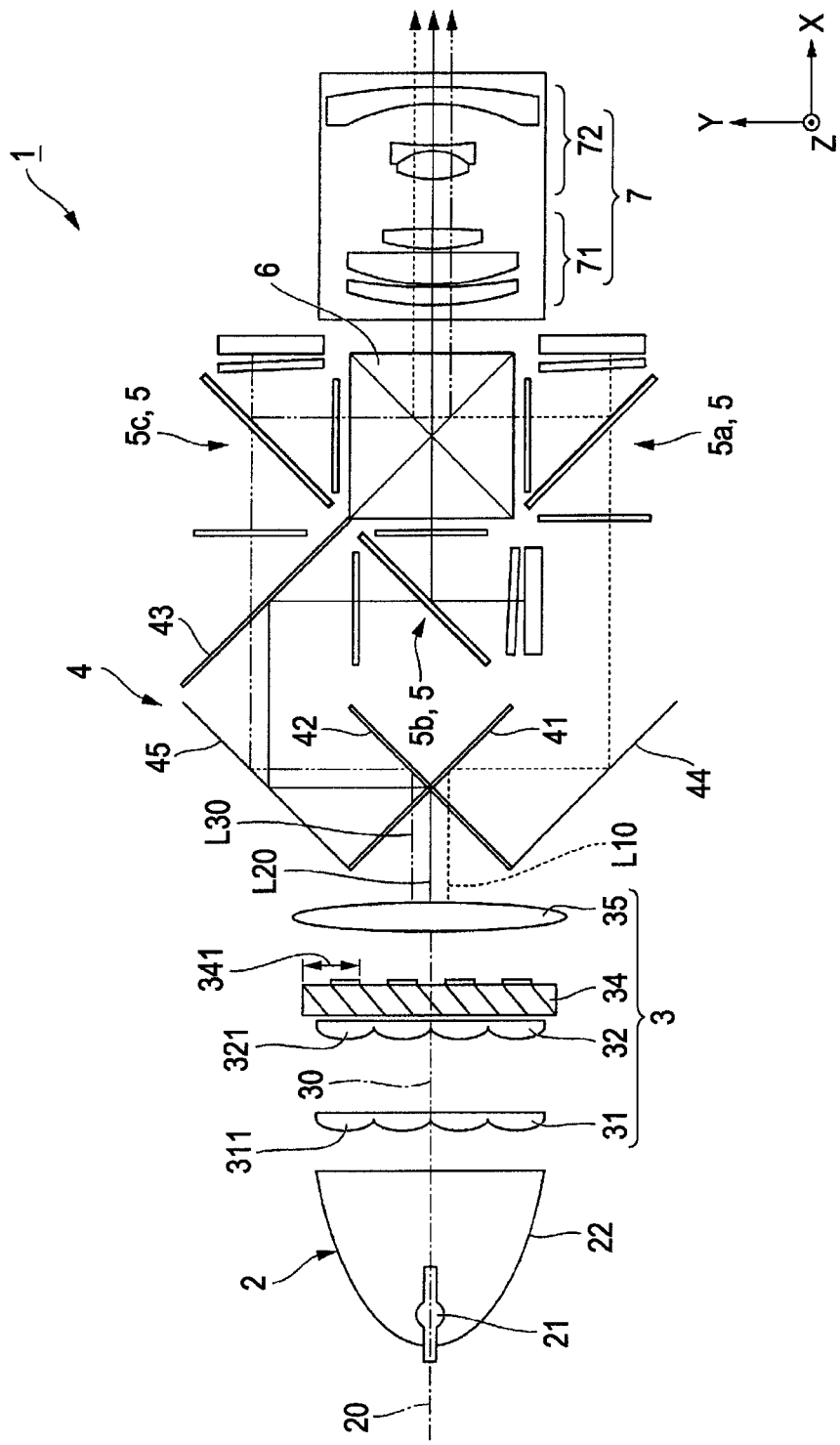
FIG. 1 is a schematic view illustrating the outline of the structure of a projector according to one or more embodiments of the invention.

FIG. 1 is a schematic view illustrating the outline of the structure of a projector 1 according to one embodiment of the invention. As illustrated in FIG. 1, the projector 1 has a light source 2, an integrator optical system 3, a color splitting optical system 4, 3-system image formation systems 5, a color compounding element 6, and a projection optical system 7. As the 3-system image formation systems 5, a first image formation system 5a, a second image formation system 5b, and a third image formation system 5c are provided. When simply described, the projector 1 operates as follows.

Light source light beams emitted from the light source 2 enter the integrator optical system 3. The light source light beams entering the integrator optical system 3 are emitted after the illumination is equalized and the polarized state is made uniform. The light source light beams emitted from the integrator optical system 3 are split into two or more color light beams by the color splitting optical system 4, and enter the respective image formation systems 5a-5c corresponding to the color light beams. The color light beams entering each of the 3-system image formation systems 5 are modulated based on the image data of an image to be displayed to become modulated light beams. The modulated light beams emitted from the 3-system image formation systems 5 are compounded by the color compounding element 6 to be a multicolor light, and the multicolor light enters the projection optical system 7. The multicolor light entering the projection optical system 7 is projected to a projection target surface (not illustrated), such as a screen. Thus, a full color image is displayed on the projection target surface.

Next, the components of the projector 1 will be described in detail.

The light source 2 has a light source lamp 21 and a parabolic reflector 22. The light beams emitted from the light source lamp 21 are reflected in one direction by the parabolic reflector 22 to become a substantially parallel bundle of rays and enter the integrator optical system 3 as the light source light beams. The light source lamp 21 is constituted by a metal halide lamp, a xenon lamp, a high-pressure mercury lamp, a halogen lamp, or the like, for example. The reflector may be constituted by an elliptical reflector, a spherical reflector, or the like instead of the parabolic reflector 22. According to the shape of the reflector, a parallelized lens for parallelizing light beams emitted from the reflector is sometimes used.

The integrator optical system 3 has a first lens array 31, a second lens array 32, a light entering-side aperture stop 33, a polarization conversion element 34, and a superimposing lens 35. An optical axis 30 of the integrator optical system 3 is substantially in agreement with an optical axis 20 of the light source 2. The respective components of the integrator optical system 3 are disposed so that the center position of each component is disposed in a line on the optical axis 30 of the integrator optical system 3.

The first lens array 31 has two or more lens elements 311 arranged on the surface substantially orthogonal to the optical axis 20 of the light source 2. The second lens array 32 has two or more lens elements 321 similarly as in the lens elements 311. The lens elements 311 and 321 are arranged, for example, in the shape of a matrix and the planar shape in terms of the plane orthogonal to the optical axis 30 is similar to the shape (here substantially rectangle) of an illumination target region 80 of a reflection type liquid crystal panel (reflection type liquid crystal device) 8 illustrated in FIG. 2. The illumination target region 80 is a region including the entire region where two or more pixels are arranged in the reflection type liquid crystal panel 8.

The polarization conversion element 34 has two or more polarization conversion units 341. The polarization conversion unit 341 has a polarization beam splitter film (hereinafter referred to as a PBS film), a ½ phase plate, and a reflection mirror although the detailed structure thereof is not illustrated.

The lens elements 311 of the first lens array 31 correspond to the lens elements 321 of the second lens array 32 on a one-to-one basis. The lens elements 321 of the second lens array 32 correspond to the polarization conversion units 341 of the polarization conversion element 34 on a one-to-one basis. The lens elements 311 and 321 and the polarization conversion units 341 corresponding to each other are disposed in a line along an axis substantially parallel to the optical axis 30.

The light source light beams entering the integrator optical system 3 enter the two or more lens elements 311 of the first lens array 31 while being spatially divided, and then condensed for every light source light beam entering the lens elements 311. The light source light beams condensed by the lens elements 311 pass through the light entering-side aperture stop 33, and forms an image on the lens elements 321 corresponding to the lens element 311. More specifically, a secondary light source image is formed in each of the two or more lens elements 321 of the second lens array 32. Light beams from the secondary light source images formed in the lens elements 321 enter the polarization conversion units 341 corresponding to the lens elements 321.

The light beams entering the polarization conversion units 341 are split into P polarized light beams and S polarized light beams to the PBS film. One polarized light beam of the split light beams reflects on the reflection mirror, and passes through the ½ phase plate, so that the polarized state is made the same as that of the other polarized light beam. Here, the light beams passing through the polarization conversion units 341 are all converted to P polarized light beams to a polarized light splitting surface of a WG (wire grid) element 54 described later. The light beams emitted from the respective two or more polarization conversion units 341 enter the superimposing lens 35 and refract thereon to be superimposed to the illumination target region 80 of the reflection type liquid crystal panel 8. By illuminating substantially the entire region of the illumination target region 80 by each of the two or more bundles of rays spatially divided by the first lens array 31, the illumination distribution is averaged by the two or more bundles of rays, so that the illumination in the illumination target region 80 is equalized.

The color splitting optical system 4 has first to third dichroic mirrors 41 to 43 having a wavelength selection surface, a first reflection mirror 44, and a second reflection mirror 45. The first dichroic mirror 41 reflects a red light beam and also transmits a green light beam and a blue light beam. The second dichroic mirror 42 transmits a red light beam and also reflects a green light beam and a blue light beam. The third dichroic mirror 43 reflects a green light beam and also transmits a blue light beam. The first and second dichroic mirrors 41 and 42 are disposed so that the wavelength selection surfaces of the mirrors are substantially orthogonal to each other and so that the wavelength selection surface of each mirror forms an angle of approximately 45° with the optical axis 30 of the integrator optical system 3.

A red light beam L10, a green light beam L20, and a blue light beam L30 contained in the light source light beams entering the color splitting optical system 4 are split as follows, and enter the corresponding image formation system 5 for every split color light beam.

The light beam L10 transmits the second dichroic mirror 42, reflects on the first dichroic mirror 41, reflects on the first reflection mirror 44, and enters the first image formation system 5a.

The light beam L20 transmits the first dichroic mirror 41, reflects on the second reflection mirror 45, reflects on the second image formation system 5b, reflects on the third dichroic mirror 43, and enters the second dichroic mirror 42.

The light beam L30 transmits the first dichroic mirror 41, reflects on the second dichroic mirror 42, reflects on the second reflection mirror 45, transmits the third dichroic mirror 43, and enters the third image formation system 5c.

The first to third image formation systems 5a to 5c all have the same structure. Here, the structure of the second image formation system 5b will be described on behalf of the first to third image formation systems 5a to 5c.

The projection optical system 7 has a first lens portion 71 and a second lens portion 72 as illustrated in FIG. 1.

Figure 2:
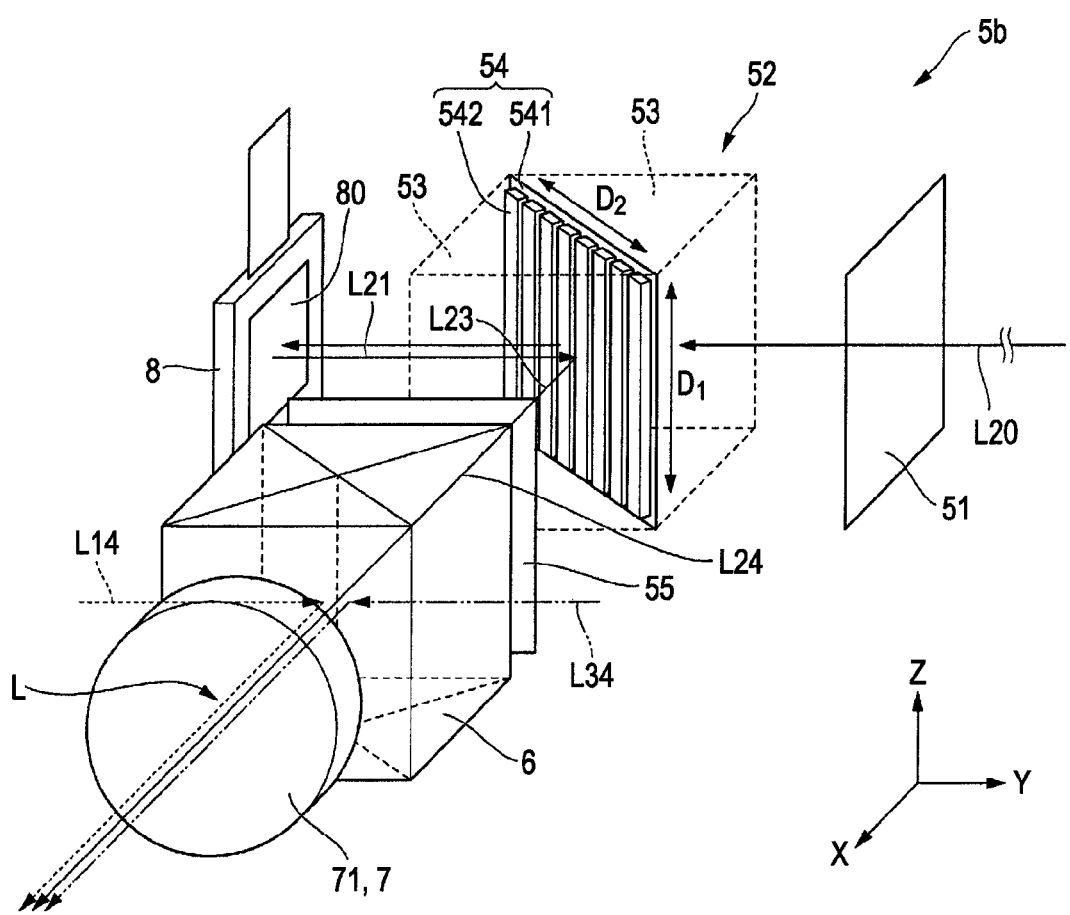
FIG. 2 is a schematic view illustrating an optical path in an image formation system.

As illustrated in FIG. 2, the second image formation system 5b has a light entering-side polarizing plate 51, a wire grid PBS 52, a reflection type liquid crystal panel 8, and a light emission-side polarizing plate 55.

The green light beam L20 which is a part of the light source light beams emitted from the color splitting optical system 4 enters the light entering-side polarizing plate 51. The light entering-side polarizing plate 51 passes a linearly polarized light beam, in which the transmission axis is set in such a manner as to pass through a P polarized light beam to the polarized light splitting surface of a WG element 54 described below. Hereinafter, the P polarized light beam to the polarized light splitting surface of the WG element 54 is simply referred to as a P polarized light beam and an S polarized light beam to the polarized light splitting surface of the WG element 54 is simply referred to as an S polarized light beam. As described above, the light source light beams passing through the integrator optical system 3 are all converted to P polarized light beams and most of the light beams L20 pass through the light entering-side polarizing plate 51, and enter the wire grid PBS 52.

The wire grid PBS 52 contains the WG element 54. A rectangular parallelepiped 53 shown by the dashed line is an additional line drawn for clarifying the positional relationship and does not exist in fact. This is because the wire grid type PBS does not need to be sandwiched by a triangular prism unlike a former dielectric multilayer type PBS. The light entering-side polarizing plate 51, the reflection type liquid crystal panel 8, and the light emission-side polarizing plate 55 are drawn with a space in the drawings but, in fact, are disposed so that they are almost in contact with the rectangular parallelepiped 53.

The WG element 54 contains a dielectric layer 541 and two or more metal wires 542. The dielectric layer 541 is constituted by a glass substrate or the like. The two or more metal wires 542 are provided on the surface of the dielectric layer 541. The two or more metal wires 542 each extend in one direction (Z direction) and are substantially parallel to each other. The extending direction of the two or more metal wires 542 is a reflection axis direction $D_1$ and the direction in which the two or more metal wires 542 are arranged in a line is a transmission axis direction $D_2$. The polarized light splitting surface is a principal surface of the WG element 54 parallel to the reflection axis direction $D_1$ and parallel to the transmission axis direction $D_2$. The normal line direction of the polarized light splitting surface forms an angle of approximately 45° to the central axis of the light beam L20 entering the polarized light splitting surface.

The S polarized light beam (first polarized light beam) in which the polarization direction is the reflection axis direction $D_1$ among the light beams L20 entering the polarized light splitting surface reflects on the polarized light splitting surface and the P polarized light beam (second polarized light beam) in which the polarization direction is the transmission axis direction $D_2$ transmits the polarized light splitting surface. The green light beam L20 emitted from the integrator optical system 3 becomes almost the P polarized light beam, and enters the reflection type liquid crystal panel 8 through the polarized light splitting surface.

Figure 3:
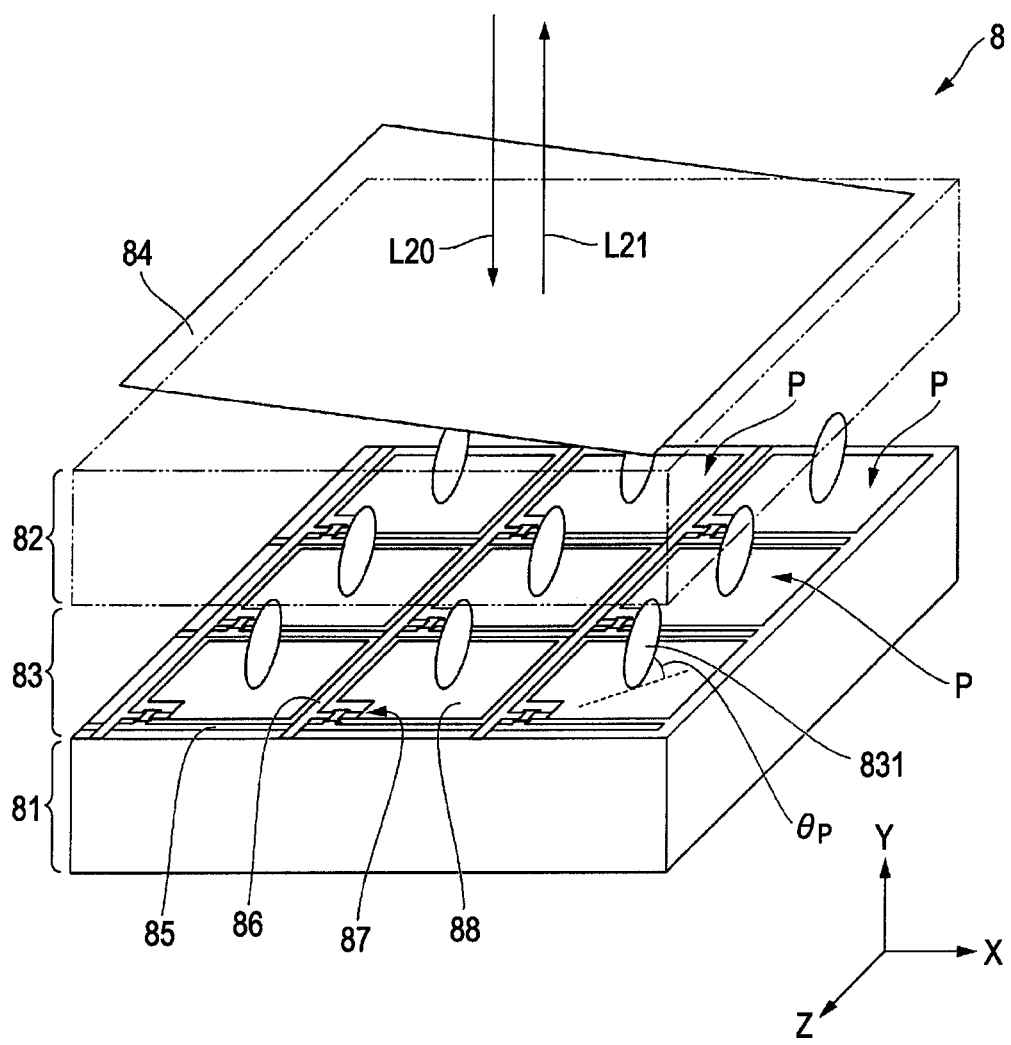
FIG. 3 is an exploded perspective view schematically illustrating the structure of a reflection type liquid crystal panel.

As illustrated in FIG. 3, the reflection type liquid crystal panel 8 has an element substrate (one of a pair of substrates) 81, a counter substrate (the other one of the pair of substrates) 82, a liquid crystal layer (liquid crystal cell) 83, and an optical compensation plate 84. The element substrate 81 is provided facing the counter substrate 82. The liquid crystal layer 83 is formed between the element substrate 81 and the counter substrate 82. The optical compensation plate 84 is provided on the counter substrate 82 on the surface opposite to the liquid crystal layer 83. The green light beam L20 passing through the WG element 54 enters the optical compensation plate 84, passes through the counter substrate 82, enters the liquid crystal layer 83, reflects on the element substrate 81, and turns. The green light beam L20 is modulated while passing through the liquid crystal layer 83 to become a light beam L21, passes through the counter substrate 82 and the optical compensation plate 84, and is emitted from the reflection type liquid crystal panel 8.

Figure 4:
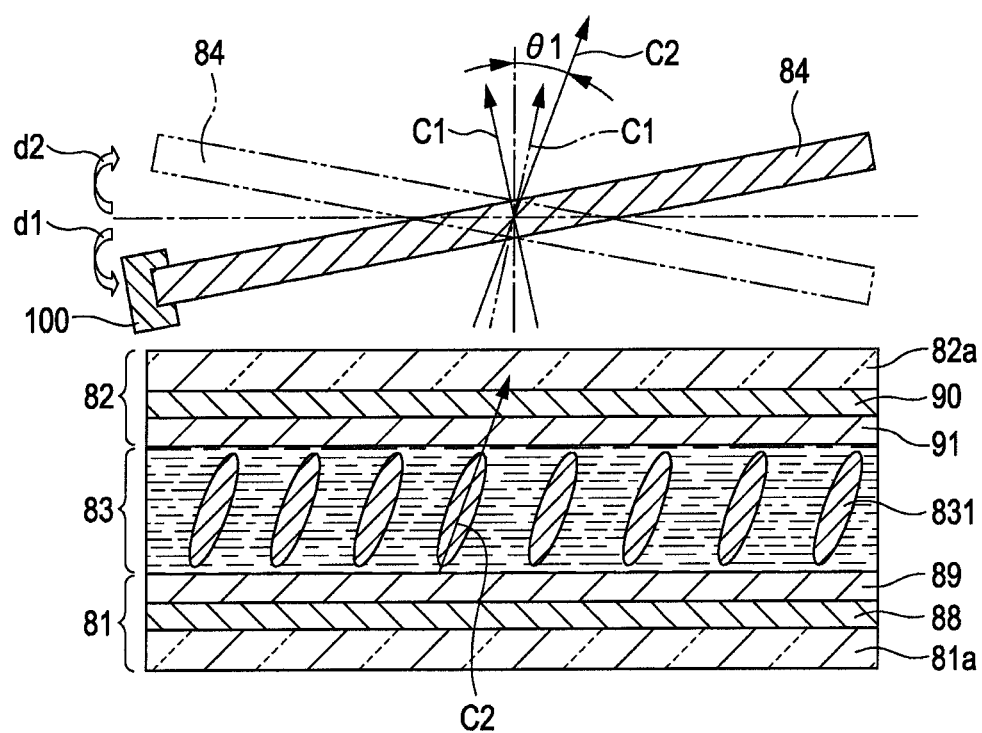
FIG. 4 is a cross-sectional view illustrating the structure of the reflection type liquid crystal panel.

In the element substrate 81, a silicon substrate or a glass substrate is constituted as a base substance 81a (FIG. 4). When using a silicon substrate, a so-called LCOS (Liquid crystal on silicon) structure is obtained. The element substrate 81 contains two or more gate lines (scan lines) 85, two or more source lines (data lines) 86, two or more thin film transistors (hereinafter referred to as a TFT) 87, and pixel electrodes 88.

The two or more gate line 85 extend parallel to each other. The two or more source line 86 extend parallel to each other. The extending direction (X direction) of the gate line 85 crosses (here orthogonal) the extending direction (Z direction) of the source line 86. The TFT 87 is provided for every intersection where one of the gate lines 85 crosses one of the source lines 86. The gate line 85 is electrically connected to the gate electrode of the TFT 87. The source line 86 is electrically connected to the source region of the TFT 87.

A portion surrounded by a pair of adjacent gate lines 85 and a pair of adjacent source lines 86 serves as one modulation element. In this embodiment, the one modulation element serves as one pixel P. The two or more pixels P are arranged with the same pitch in one direction (X direction) and are arranged with the same pitch in the other one direction (Z direction). An independent island-like pixel electrode 88 is provided for every pixel P. The pixel electrode 88 of this embodiment contains a metal material and also serves as a mirror reflection plate. In FIG. 3, the pixel electrode 88 is partially removed for clarity and the base side of the pixel electrode 88 is schematically illustrated. In fact, the pixel electrode 88 covers the gate line 85, the source line 86, and the TFT 87 through a flattening layer and an insulating layer, and the opening ratio of the pixel P is increased. The pixel electrode 88 is electrically connected to a drain region of the TFT 87.

As illustrated in FIG. 4, an alignment film 89 is provided covering the pixel electrode 88. When a work function difference with the counter substrate 82 causes flicker or sticking, an insulating film may be provided between the alignment film 89 and the pixel electrode 88.

In the counter substrate 82, a glass substrate is constituted as a base 82a and, as illustrated in FIG. 4, a common electrode 90 containing a transparent conductive material is provided on the liquid crystal layer 83 side of the counter substrate 82. An alignment film 91 is provided on the liquid crystal layer 83 side of the common electrode 90.

The alignment films 89 and 91 are formed by, for example, an oblique deposition method. The degree of vacuum when starting the vapor deposition was adjusted to $5 \times 10^{-3}$ P$_a$ and the substrate temperature was adjusted to 100° C. In order to give anisotropy to the films, the vapor deposition was performed from the direction tilting at 45° with respect to the substrate surface. Thus, an $SiO_2$ column grew in the direction tilting at 70° with respect to the substrate surface in the same direction as that of the vapor deposition. The alignment films 89 and 91 on the upper and lower substrates 81 and 82, respectively, were formed so that they are in anti-parallel to each other. On the alignment films 89 and 91, liquid crystal molecules 831 of the liquid crystal layer 83 having a negative dielectric constant anisotropy have a pretilt angle $\theta_p$ of, for example, 85° based on the direction along the substrate surface (0°) in the same direction as that of the vapor deposition.

The liquid crystal layer 83 is constituted by, for example, a VA mode liquid crystal layer. The cell gap between the element substrate 81 and the counter substrate 82 is about 1.8 μm, for example. The cell gap is charged with a liquid crystal material, whereby the liquid crystal layer 83 is formed. The liquid crystal material has a negative dielectric constant anisotropy and has a birefringence Δn of, for example, 0.12.

The reflection type liquid crystal panel 8 according to this embodiment has a tilt mechanism 100 in which the optical compensation plate 84 can be disposed in a tilted state. The optical compensation plate 84 is constituted by a C plate having a negative refractive-index anisotropy and having an optical axis C1 (first optical axis) along the thickness direction. The refractive index of the optical compensation plate 84 is represented by nx=ny>nz and a retardation value in the thickness direction is, i.e., 220 nm as calculated by ((nx+ny)/2−nz)·d, where d represents the thickness of the optical compensation plate 84, nx and ny each represent the main refractive index in the plane direction of the optical compensation plate 84, and nz represents the main refractive index in the direction of the optical axis C1.

The tilt mechanism 100 can dispose the optical compensation plate 84 in a tilted state in the first direction in which a standard angle θ1 becomes larger or in a second direction in which, conversely, the standard angle θ1 becomes smaller. The acute angle formed between (i) the optical axis C1 when the optical compensation plate 84 is located parallel to the plate surface (i.e., the surface of the element substrate 81) of the liquid crystal layer 83 and (ii) the optical axis (second optical axis) C2 of the liquid crystal molecule 831 is defined as the standard angle θ1.

Here, a tilt in the first direction d1 means tilting the optical compensation plate 84 in the direction (e.g., the counterclockwise direction in FIG. 4) in which the optical axis C1 and the optical axis C2 are angularly moved away from the almost parallel state (hereinafter referred to as an opposite direction tilt). In contrast, a tilt in a second direction d2 means tilting the optical compensation plate 84 in the direction (e.g., the clockwise direction in FIG. 4) in which the optical axis C1 and the optical axis C2 are angularly moved toward the parallel state (hereinafter referred to as a forward direction tilt). The tilt mechanism 100 can continuously adjust the tilt angle of the optical compensation plate 84 from the forward direction to the opposite direction, which increases the compensation capability by the optical compensation plate 84.

Embodiments of the invention employ a structure in which the tilt mechanism 100 can tilt the optical compensation plate 84 in both the forward direction and the opposite direction, utilizing properties of the reflection type liquid crystal panel such that equivalent optical compensation properties are obtained in any of the forward direction tilt and the opposite direction tilt of the optical compensation plate 84 as described below.

Next, the operation of the tilt mechanism 100 will be described. First, the case where the optical compensation plate 84 is disposed without a shift in the tilt mechanism 100 will be described.

Figure 5:
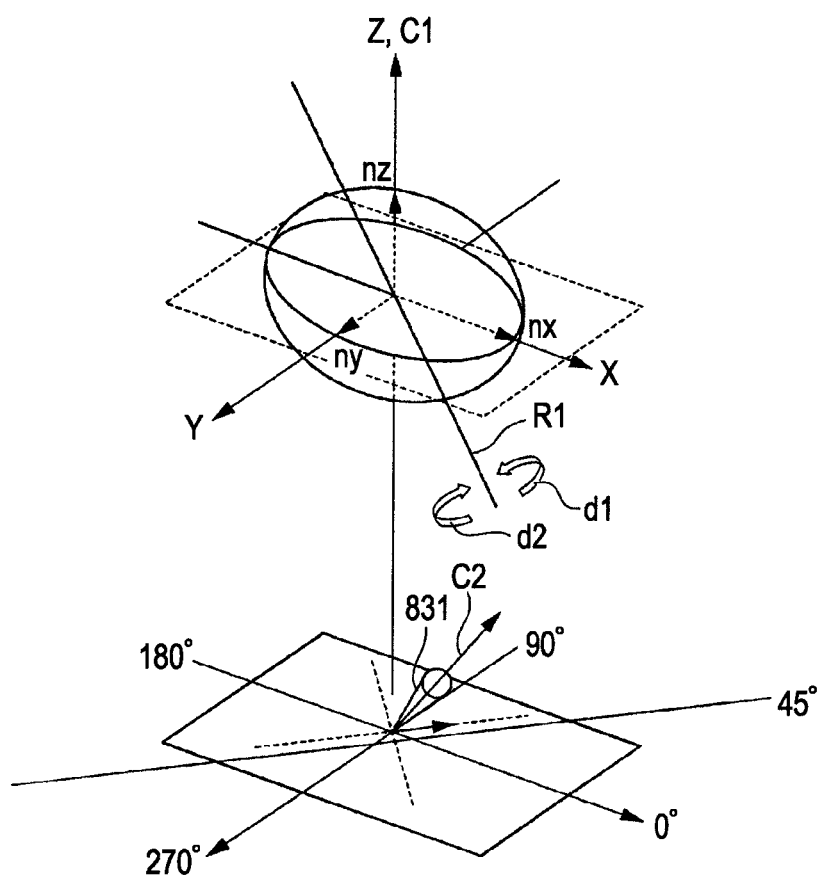
FIG. 5 is a perspective view illustrating the initial positional relationship of the optical axes of a compensation plate without a shift and a liquid crystal layer.
Figure 6:
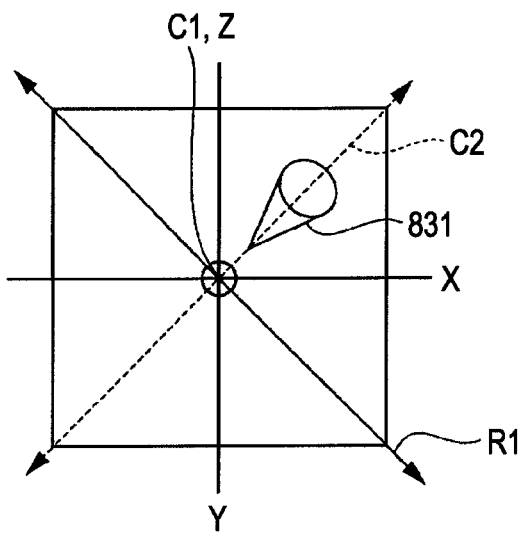
FIG. 6 is a plan view of FIG. 5.
Figure 7:
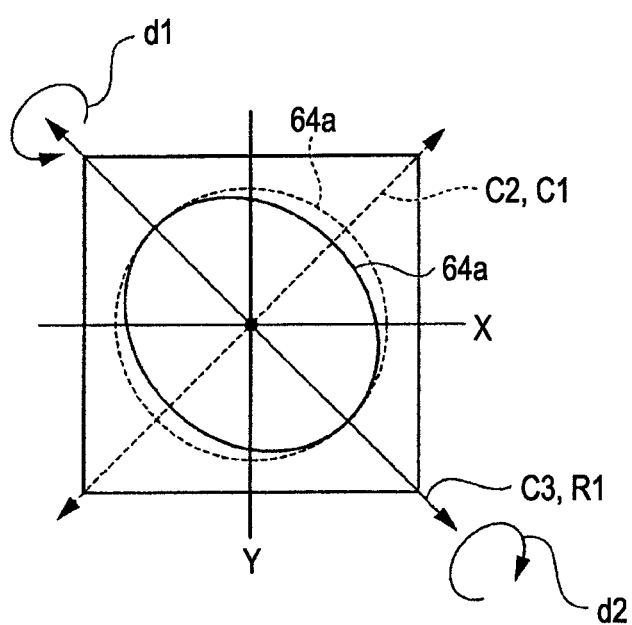
FIG. 7 is a plan view illustrating a relationship between a slow axis formed from the optical compensation plate and the optical axis of a liquid crystal molecule.
Figure 8:
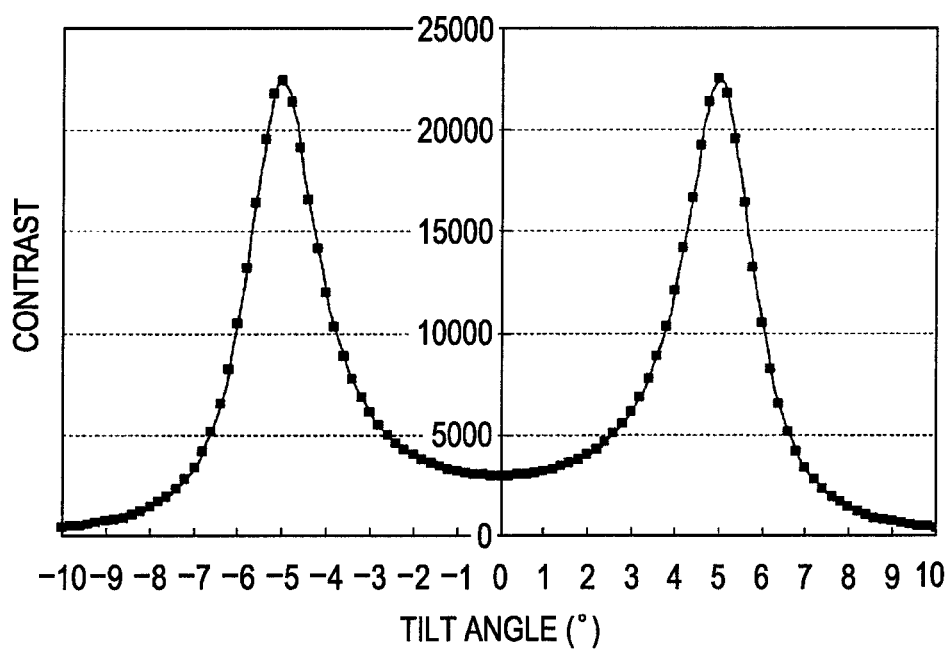
FIG. 8 is a graph illustrating a change in contrast when the compensation plate is tilted.

FIG. 5 is a perspective view illustrating the positional relationship of the optical axes of the optical compensation plate 84 before tilting and the liquid crystal layer 83. FIG. 6 is a plan view of FIG. 5. FIG. 7 is a plan view illustrating the positional relationship of a slow axis formed by the optical compensation plate 84 tilted by the tilt mechanism 100 and the optical axis of the liquid crystal layer 83. FIG. 8 is a graph showing the results of measuring the contrast of the reflection type liquid crystal panel 8 when tilting the optical compensation plate 84 in the forward direction or in the opposite direction by the tilt mechanism 100.

As illustrated in FIGS. 5 and 6, the direction of the optical axis C1 of the optical compensation plate 84 corresponds to the thickness direction of the liquid crystal layer 83 in the initial state before tilting. The axis of rotation R1 of the optical compensation plate 84 in the tilt mechanism 100 is included in a plane formed by the main refractive indices nx and ny of the optical compensation plate 84 and is set on an XY plane parallel to the surface of the liquid crystal layer 83.

As illustrated in FIGS. 5 and 6, the optical axis C2 of the liquid crystal molecule 831 is set, in an initial state, in a direction in such a manner as to form an azimuth angle of 45° in the counterclockwise direction from a +X axis in the XY plane. The optical compensation plate 84 is set, in an initial state, so that the azimuth angle direction of the optical axis C1 and the Z-direction of the liquid crystal layer 83 are in alignment with each other, as best seen in FIG. 6. The axis of rotation R1 of the tilt mechanism 100 is set so as to tilt the optical compensation plate 84 so that the azimuth angle direction of the optical axis C1 and the azimuth angle direction of the optical axis C2 of the liquid crystal molecule 831 having a pretilt are in alignment with each other, as best seen in FIG. 7.

When the tilt mechanism 100 rotates the optical compensation plate 84 about the axis of rotation R1 in either the clockwise direction or the counterclockwise direction (the forward direction tilt or the opposite direction tilt), the projection of a refractive index ellipsoid 64a on the XY plane becomes an oval shape as illustrated in FIG. 7. More specifically, the optical compensation plate 84 can form a slow axis C3 in the direction substantially orthogonal to the optical axis C2 of the liquid crystal molecule 831 by being tilted by the tilt mechanism 100. Thus, the optical compensation plate 84 can favorably compensate for a phase difference generated when the liquid crystal molecule 831 (or the liquid crystal layer 83) has a pretilt.

Here, even when the optical compensation plate 84 is tilted in either the forward direction or the opposite direction by the tilt mechanism 100, an equivalent contrast is obtained in the reflection type liquid crystal panel 8 as illustrated in the graph of FIG. 8, unlike a transmission type liquid crystal panel. This is because, in the reflection type liquid crystal panel, light beams pass through the liquid crystal layer 83 twice unlike the transmission type liquid crystal panel, and thus the retardation of an incident light beam and the retardation of a reflection light beam are different from each other but the total amount is averaged and the retardation becomes substantially constant (self-compensation type). Therefore, the viewing angle characteristics are likely to be relatively symmetrical and the front phase difference can be compensated for even when the tilt direction of the optical compensation plate 84 is reversed, and thus a contrast equivalent to that obtained in the forward direction can be obtained.

In practical use, it is difficult to dispose the optical compensation plate 84 in the tilt mechanism 100 with completely no shift. Then, a case where a positional shift (variations in the optical conditions) from the initial state occurs in the optical compensation plate 84 disposed in the tilt mechanism 100 will be described.

Figure 9:
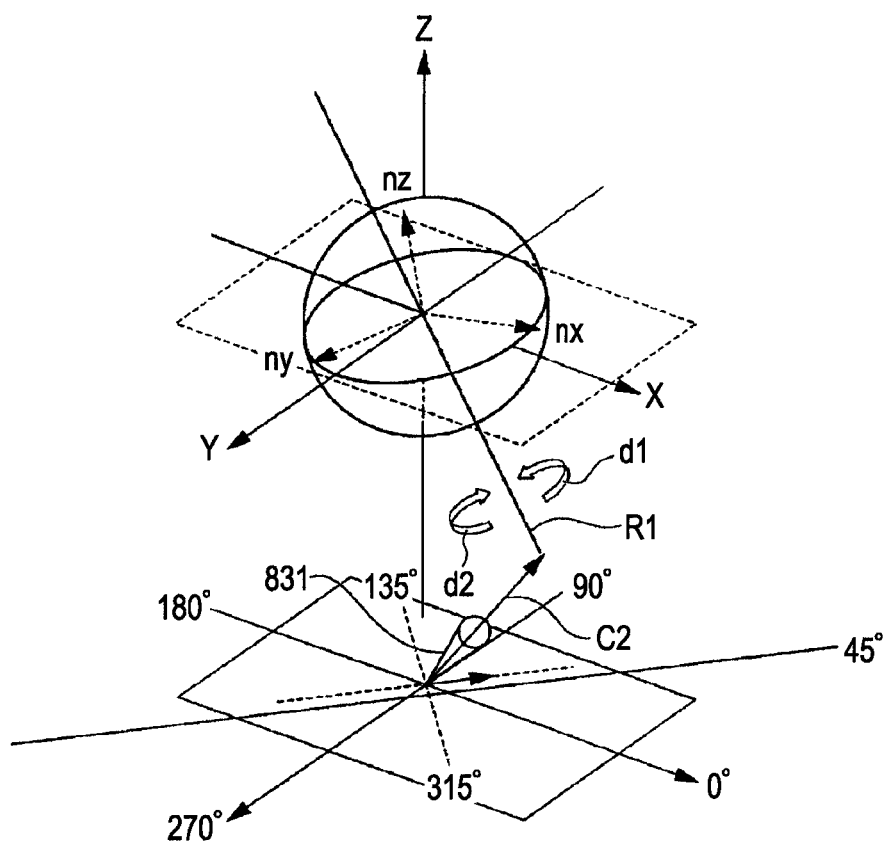
FIG. 9 is a perspective view illustrating the initial positional relationship of the optical axes of a compensation plate with a shift and a liquid crystal layer.
Figure 10:
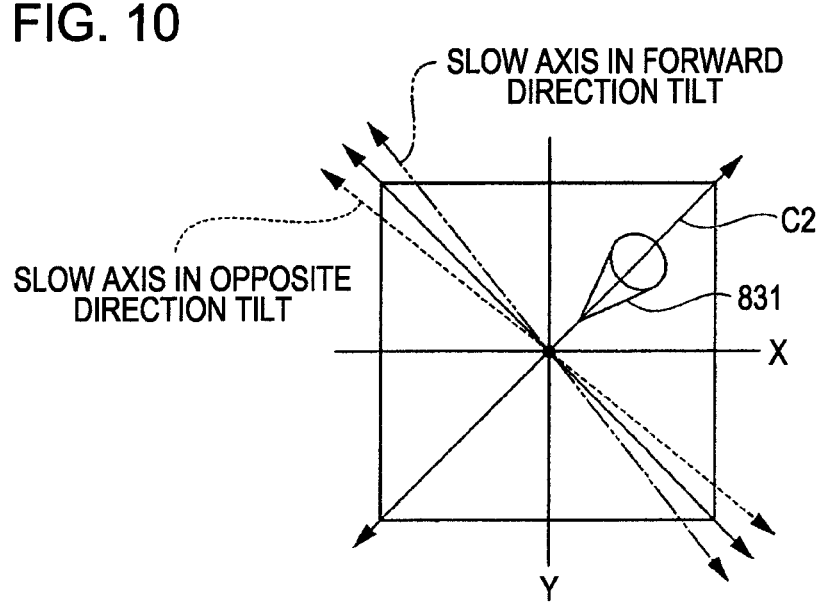
FIG. 10 is a plan view of FIG. 9.

FIG. 9 is a perspective view illustrating the positional relationship of the optical axes of the optical compensation plate 84 before tilting and the liquid crystal layer 83. FIG. 10 corresponds to the plan view of FIG. 9 and illustrates a slow axis formed by tilting the optical compensation plate 84.

As illustrated in FIGS. 9 and 10, the optical axis C2 of the liquid crystal molecule 831 is set, in an initial state, in an azimuth angle direction forming 45° in the counterclockwise direction from the +X axis in the XY plane parallel to the surface of the liquid crystal layer 83, similarly to FIG. 5. The azimuth angle direction of the optical axis C1 of the optical compensation plate 84 is set, in an initial state, in a direction forming 135° in the counterclockwise direction from the +X axis.

In the optical compensation plate 84, the direction of the optical axis C1, in the initial state, shifts from the thickness direction (the Z direction) of the liquid crystal layer 83, and the azimuth angle direction of the optical axis C1 of the optical compensation plate 84 and the azimuth angle direction of the optical axis C2 of the liquid crystal molecule 831 cross, i.e., the optical axis C1 and the optical axis C2 are, unlike the embodiment(s) of FIG. 7, not aligned. More specifically, the optical compensation plate 84 is disposed in the tilt mechanism 100 in an initial state where a positional shift in the optical axis C1 occurs in the above-described direction. Therefore, the axis of rotation R1 of the optical compensation plate 84, while still being set on the XY plane parallel to the surface of the liquid crystal layer 83, is not set on the plane formed by the main refractive indices nx and ny of the optical compensation plate 84, but set at a shifted position.

In the tilt mechanism 100, when the optical compensation plate 84 is rotated about the axis of rotation R1 in either the clockwise direction or the counterclockwise direction (the forward direction or the opposite direction tilt), the projection of the refractive index ellipsoid 64a on the XY plane becomes an oval shape. However, as illustrated in FIG. 10, since the tilt direction of the optical axis C1 varies depending on the tilt direction of the optical compensation plate 84, the slow axis C3 formed in the direction substantially orthogonal to the optical axis C1 also varies depending on the tilt direction.

Therefore, when a positional shift from the initial state occurs in the optical compensation plate 84 disposed in the tilt mechanism 100 as described above, the direction of tilting the optical compensation plate 84 becomes a consideration.

Figure 11:
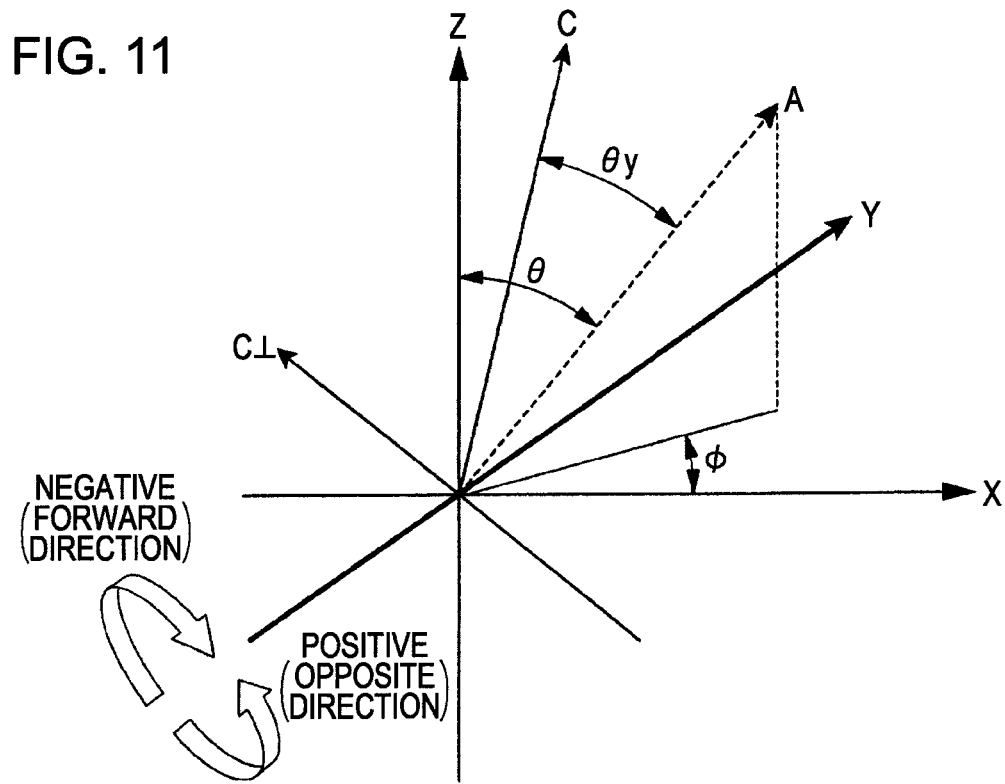
FIG. 11 is a view illustrating the optical axis of the optical compensation plate in a spherical coordinate.
Figure 12:
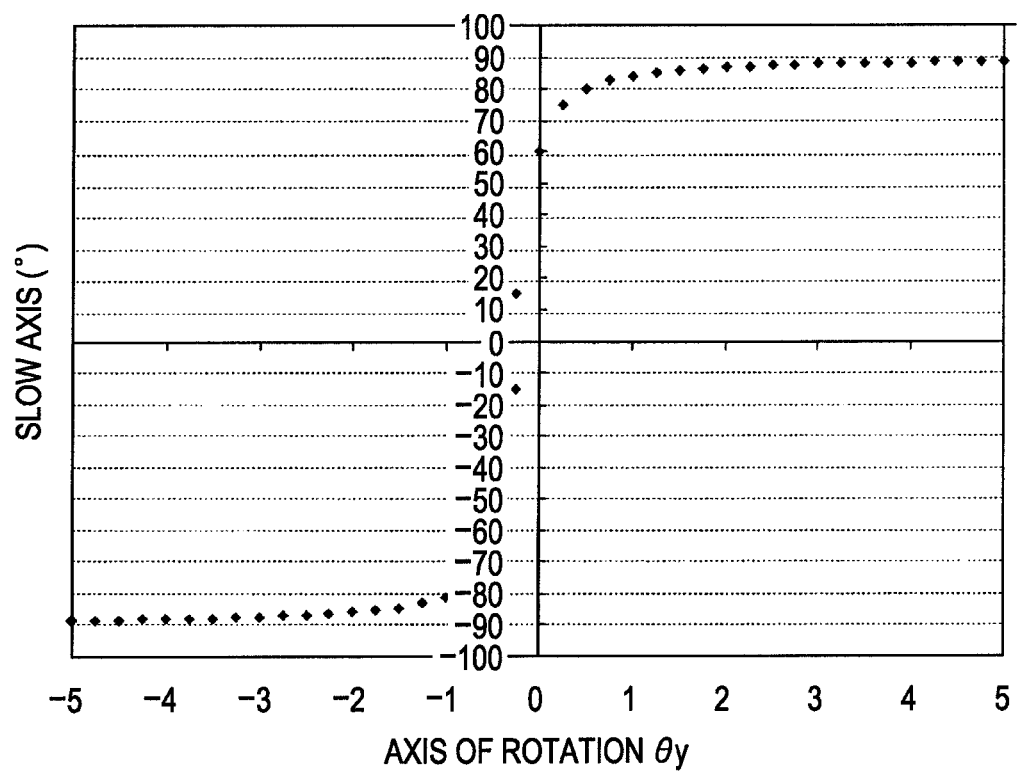
FIG. 12 is a graph illustrating a change in the slow axis formed by rotating the tilted optical compensation plate.
Figure 13:
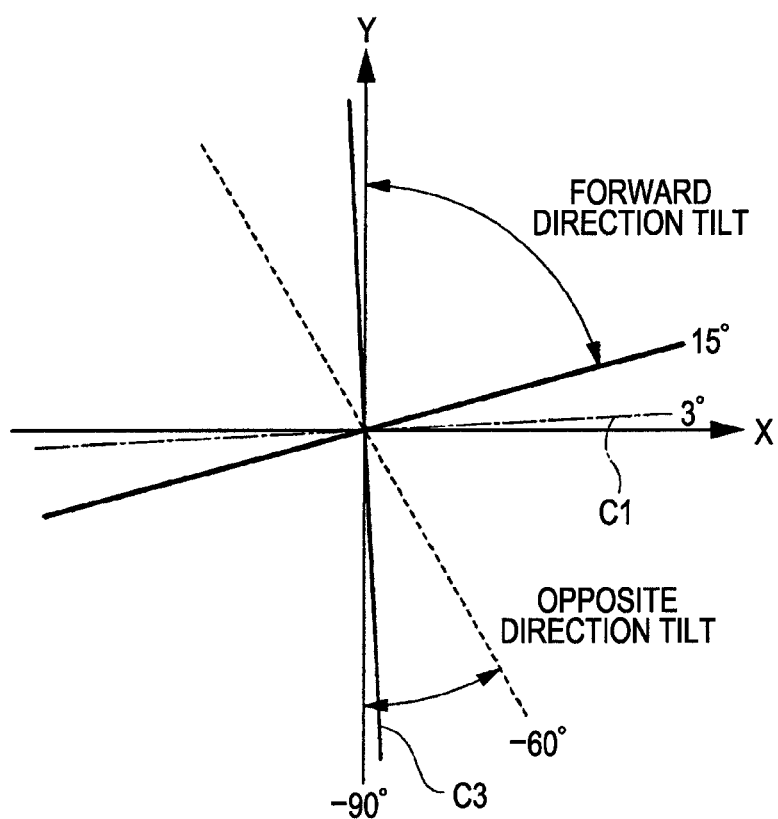
FIG. 13 is a view illustrating the positional relationship of the slow axis of the optical compensation plate and a slow axis of the liquid crystal molecule.

Subsequently, a case where the tilt direction of the initial state of the optical axis C2 is explained, and the change in the slow axis C3 formed by tilting the optical compensation plate 84 is generalize will be described. FIG. 11 is a view illustrating the optical axis C1 of the optical compensation plate 84 in the spherical coordinate. FIG. 12 is a graph showing a change range of the slow axis formed by rotating the optical compensation plate 84 tilting in a given direction in a state where the optical axis C2 is in the initial state as described above. FIG. 13 is a view illustrating the positional relationship of the slow axis of the optical compensation plate 84 and the slow axis of the liquid crystal molecule 831 as viewed in the thickness direction of the liquid crystal layer 83. In FIG. 11, the X axis direction is defined as the tilt direction of the liquid crystal molecule 813, the plane of the plate surface of the liquid crystal layer 83 is defined as an XY plane, and the Z axis is specified in the thickness direction of the liquid crystal layer 83 orthogonal to the XY plane.

In FIG. 11, the optical axis C1 is represented by a vector A in the initial state (state before tilting in the tilt mechanism 100) and the optical axis C1 after rotating the same by an angle θy around the Y axis is represented by a vector C. Here, since the slow axis of the optical axis C1 represented by the vector C is substantially orthogonal to the vector C on the XY plane, the slow axis can be represented by a vertical vector C⊥.

Here, when the vector A is represented in the spherical coordinate, Equation (1) is obtained. In Equation (1), r=1 is established. Equation (2) is a rotation matrix B by which the vector A is rotated around the Y axis by θy. By the product of the vector A and the rotation matrix B, the vector C in Equation (3) is determined. The vertical vector C⊥ on the XY plane to the vector C is calculated by Equation (4).

$$A = \begin{pmatrix} x \\ y \\ z \end{pmatrix} = \begin{pmatrix} r\sin\theta\cdot\cos\theta \\ r\sin\theta\cdot\sin\theta \\ r\cos\theta \end{pmatrix} = \begin{pmatrix} \sin\theta\cdot\cos\theta \\ \sin\theta\cdot\sin\theta \\ \cos\theta \end{pmatrix} \quad \text{Equation (1)}$$

$$B = \begin{pmatrix} \cos\theta_y & 0 & \sin\theta_y \\ 0 & 1 & 0 \\ -\sin\theta_y & 0 & \cos\theta_y \end{pmatrix} \quad \text{Equation (2)}$$

$$AB = \begin{pmatrix} \cos\theta y & 0 & \sin\theta y \\ 0 & 1 & 0 \\ \sin\theta y & 0 & \cos\theta y \end{pmatrix} \begin{pmatrix} \sin\theta\cdot\cos\varphi \\ \sin\theta\cdot\sin\varphi \\ \cos\theta \end{pmatrix} \quad \text{Equation (3)}$$

$$= \begin{pmatrix} \sin\theta\cdot\cos\varphi\cdot\cos\theta y + \sin\theta y\cdot\cos\theta \\ \sin\theta\cdot\cos\varphi \\ \sin\theta\cdot\cos\varphi\cdot\sin\theta y + \cos\theta y\cdot\cos\theta \end{pmatrix}$$

$$C_\perp = \begin{pmatrix} -\sin\theta\cdot\cos\varphi \\ \sin\theta\cdot\cos\varphi\cdot\cos\theta y + \sin\theta y\cdot\cos\theta \\ 0 \end{pmatrix} \quad \text{Equation (4)}$$

By setting the initial angles θ (inclination angle from the Z direction) and φ (azimuth angle from the X direction) of the optical axis C1 in Equation (4) (FIG. 11), the slow axis when rotating the optical compensation plate 84 can be calculated. For example, when the initial angles are as follows: φ=30° and θ=0.25° and the pretilt of the liquid crystal molecule 831 is 89°, the slow axis when rotating the optical compensation plate 84 around the Y axis is shown in the graph of FIG. 12.

Here, the horizontal axis in the graph of FIG. 12 represents the θy value (the rotation angle of the optical compensation plate 84). The case where the optical compensation plate 84 is tilted in the opposite direction (direction in which the optical axis C1 is away from the optical axis C2 of the liquid crystal molecule 831) was defined to be positive and the case where the optical compensation plate 84 is tilted in the forward direction opposite to the direction above (direction in which the optical axis C1 comes close to the optical axis C2 of the liquid crystal molecule 831) was defined to be negative.

As illustrated in FIGS. 12 and 13, when performing the opposite direction tilt the slow axis (vertical vector C⊥) of the optical compensation plate 84 varies in the range of −60° to −90° at a rotation angle in which the counterclockwise rotation based on the direction of the +X axis is positive on the XY plane. In contrast, when performing the forward direction tilt, the slow axis of the optical compensation plate 84 varies in the range of 15° to 90°. The case of ±90° refers to that the slow axis is orthogonal to the pretilt direction (X axis) of the liquid crystal molecule 831 and, by favorably compensating for a phase difference by the liquid crystal molecule 831, the contrast becomes the maximum.

As illustrated in FIG. 12, when the tilt angle θy of the optical compensation plate 84 is in the range of ±1° to 2°, the slow axis can be formed in a direction orthogonal to the pretilt direction (X axis) of the liquid crystal molecule 831 and the maximum contrast value can be displayed in the opposite direction tilt, compared with the case of the forward direction tilt. More specifically, according to the reflection type liquid crystal panel 8 of this embodiment, the tilt angle of tilting the optical compensation plate 84 can be made small when achieving the highest contrast display. This is particularly effective in the case where optical members are disposed around the reflection type liquid crystal panel 8 as in the projector 1 and the space for rotating the optical compensation plate 84 is limited (when the tilt angle is limited).

Inorganic alignment films 88 and 89 that impart a pretilt to the liquid crystal molecules 831 are formed using the oblique deposition method as described above. In the oblique deposition method, the vapor deposition direction (angle) spreads toward the outside of the substrate surface from the vapor deposition source, and thus a shift occurs in the direction in which a column grows to shift the azimuth angle of the liquid crystal molecule 831, resulting in a possibility that the azimuth angle direction of the optical axis C2 of the liquid crystal molecule 831 shifts as represented by the chain lines in FIGS. 10 and 11. Therefore, in the reflection type liquid crystal panel 8, there is a possibility that variations in the optical conditions, such as a shift in the orientation direction of the liquid crystal molecules 831, occur.

For example, when the pretilt direction (optical axis C2 direction) of the liquid crystal molecule 831 shifts by about 3° from the X direction as represented by the alternate long and short dash line in FIG. 13 due to the above-described orientation direction shift in the liquid crystal molecule 831. Nevertheless, it is still possible to orient the slow axis C3 in a direction, as shown in FIG. 13, substantially orthogonal to the direction of the optical axis C2 of the liquid crystal molecule 831 when tilting the optical compensation plate 84 in the opposite direction. More specifically, when performing the opposite direction tilt, the maximum contrast in the reflection type liquid crystal panel 8 can be obtained.

In practical use, it is difficult to dispose the optical compensation plate 84 in the tilt mechanism 100 without a shift and to suppress the occurrence of variations in the optical conditions, such as a shift in the rotation center of the optical compensation plate 84, a shift in the orientation direction of the liquid crystal molecules, and a shift in the optical axis C1 of the optical compensation plate 84 due to manufacturing errors. When such variations in the optical conditions occur, the optimal direction for tilting the optical compensation plate 84 changes in order to perform favorable compensation as described above.

According to the reflection type liquid crystal panel 8 of this embodiment, the optical compensation plate 84 can be tilted in the forward direction and the opposite direction by the tilt mechanism 100, and thus a wide optical compensation suppressing variations in the optical conditions, that are otherwise difficult to sufficiently compensate for by tilting the optical compensation plate in only one direction, can be performed. Therefore, even when variations in the optical conditions occur, a high contrast display is achieved.

When a gate signal is supplied to the gate line 85 in the reflection type liquid crystal panel having the above-described structure, the TFT 87 connected to the gate line 85 is turned ON. A source signal in accordance with a gradation value for every pixel is supplied to the source line 86 in the state where the TFT 87 is turned ON, and the source signal is supplied to the pixel electrode 88 through the TFT 87. When the source signal is supplied to the pixel electrode 88, an electric field is applied between the pixel electrode 88 and the common electrode. Then, the orientation state of the liquid crystal layer 83 changes for every pixel P in accordance with the electric field. The light beam L20 entering the pixel P changes the polarized state in accordance with the orientation state of the liquid crystal layer 83 in the pixel P. The light beam L20 passing through the liquid crystal layer 83 is emitted from a light emission surface of the liquid crystal layer 83 as the modulated light beam L21.

In this embodiment, the light beams L20 entering the pixels P in a state where an electric field is not applied to the liquid crystal layer 83 in the pixels P are emitted as the P polarized light beams almost without changing the polarized state. In the light beams L20 entering the pixel P in the state where an electric field is applied to the liquid crystal layer 83 in the pixels P, the P polarized light beams are changed to the S polarized light beam with a ratio in accordance with the gradation value specified by image data. More specifically, the S polarized light beam included in the light beams L21 is a light beam showing the image to be displayed and the P polarized light beam included in the light beams L21 is a light beam showing a reversed image of the image to be displayed. The central axes of the light beams L21 emitted from the respective two or more pixels P are substantially parallel to each other and substantially perpendicular to the light emission surface of the liquid crystal layer 83.

Returning to FIG. 2 again, the light beams L21 emitted from the reflection type liquid crystal panel 8 enter the polarized light splitting surface of the WG element 54. The P polarized light beam included in the light beams L21 transmits through the polarized light splitting surface and the S polarized light beam included in the light beams L21 reflects on the polarized light splitting surface. Among the light beams L21, the light beam L23 (mainly the S polarized light beam) reflecting on the polarized light splitting surface travels toward the light emission-side polarizing plate 55 (FIG. 2). The light beam (mainly the P polarized light beam) transmitting through the polarized light splitting surface among the light beams L21 travels toward the light entering-side polarizing plate 51, and is removed from the optical path toward the projection optical system 7. The light emission-side polarizing plate 55 passes a linearly polarized light beam and the transmission axis is set in such a manner as to pass the S polarized light beam through. The light beam L24 passing through the light emission-side polarizing plate 55 among the light beams L23 enters the color compounding element 6.

The red light beam L10 entering the first image formation system 5a illustrated in FIG. 1 is modulated similarly as in the green light beam L20 and is emitted from the first image formation system 5a as the S-polarized red light beam L14 showing the image to be displayed. Similarly, the S-polarized blue light beam L34 showing the image to be displayed is emitted from the third image formation system 5c. As illustrated in FIG. 3, the light beams L14, L24, and L34 enter the color compounding element 6.

The color compounding element 6 is constituted by a dichroic prism or the like. The dichroic prism has a structure in which four triangular prisms are adhered to each other. The surface to be adhered in the triangular prism serves as the inner surface of the dichroic prism. On the inner surface of the dichroic prism, a first wavelength selection surface that reflects a red light beam and transmits a green light beam and a blue light beam and a second wavelength selection surface that reflects a blue light beam and transmits a red light beam and a green light beam are formed orthogonal to each other.

The light beam L24 which is the S-polarized green light beam entering the dichroic prism passes through the wavelength selection surfaces and is emitted as it is. The S-polarized red light beam L14 and the S-polarized blue light beam L34 entering the dichroic prism selectively reflect on or transmit through the wavelength selection surfaces and are emitted in the same direction as the emission direction of the S-polarized green light beam L24. The green light beam L24 may be converted to the P polarized light beam by a ½ wavelength plate as required. In such a case, the light efficiently transmits through the dichroic prism. Thus, the three color light beams are superimposed and compounded to become a multicolor light beam L, and the multicolor light beam enters the projection optical system 7.

As described above, the reflection type liquid crystal panel 8 to which one or more embodiment of the invention is applied can achieve a high contrast display even when variations in the optical conditions, which are highly probable in practical use, occur.

According to the projector 1 to which the reflection type liquid crystal panel 8 in accordance with one or more embodiment of the invention is applied, a high contrast display is obtained by imparting the optical compensation properties suppressing the above-described variations in the optical conditions, a projector having a high image display quality and high reliability can be provided.

The technical scope of the invention is not limited to the above-described embodiments. Various modifications can be made. For example, as the light source, solid light sources, such as a light emitting diode (LED) and a laser diode (LD), may be used instead of the lamp light source. The structure of the integrator optical system or the color splitting optical system is omitted or changed according to the type of the light source and the like.

What is claimed is:
1. A reflection type liquid crystal device, comprising:
a pair of substrates;
an optical compensation plate disposed outside the pair of substrates, having a negative refractive-index anisotropy, and having a first optical axis along the thickness direction of the optical compensation plate;
a liquid crystal cell held between the pair of substrates and having a pretilt at which a second optical axis of a liquid crystal molecule of the liquid crystal cell is inclined with respect to a plate surface of the liquid crystal cell; and a tilt mechanism configured to tilt the optical compensation plate continuously relative to the liquid crystal cell and configured to rotate toward a first direction and a second direction about an axis of rotation, wherein the axis of rotation is not disposed in a plane of the optical compensation plate, but disposed at a shifted position, the first direction is a direction in which a standard angle becomes larger, the second direction is an opposite direction to the first direction, the standard angle is defined as an acute angle formed between the first optical axis and the second optical axis when the optical compensation plate is located so as to be parallel to the plate surface of the liquid crystal cell, the liquid crystal cell has at least one contrast peak by tilting the optical compensation plate along with the first direction and the second direction respectively, and the tilt mechanism is configured to tilt the optical compensation plate toward a direction along with the first direction or the second direction, so as to have a contrast peak by smaller rotation angle from the optical compensation plate parallel to the plate surface of the liquid crystal cell.

2. The liquid crystal device according to claim 1, wherein the tilt mechanism is arranged for tilting the optical compensation plate about an axis of rotation disposed in a plane of the optical compensation plate, so that the second optical axis of the liquid crystal cell and the direction of a slow axis of the tilted optical compensation plate are substantially orthogonal to each other.

3. A projector, comprising the reflection type liquid crystal device according to claim 1.

4. A reflective liquid crystal device, comprising:
a pair of substrates;
an optical compensation plate disposed outside the pair of substrates, and having a first optical axis along the thickness direction of the optical compensation plate;
a liquid crystal cell held between the pair of substrates and having a pretilt at which a second optical axis of liquid crystal molecules of the liquid crystal cell is inclined with respect to a plate surface of the liquid crystal cell; and
a tilt mechanism configured to tilt the optical compensation plate continuously relative to the liquid crystal cell, so that the second optical axis of the liquid crystal cell and the direction of a slow axis of the tilted optical compensation plate are substantially orthogonal to each other,
the optical compensation plate has an initial state before tilting where the azimuth angle direction of the first optical axis of the optical compensation plate as projected on the plate surface of the liquid crystal cell is not aligned with the azimuth angle direction of the second optical axis of the liquid crystal cell,
the tilt mechanism is configured to rotate the optical compensation plate toward a first direction and a second direction about an axis of rotation, wherein the first direction is a direction in which a standard angle becomes larger, the second direction is an opposite direction to the first direction, the standard angle is defined as an acute angle formed between the first optical axis and the second optical axis when the optical compensation plate is located so as to be parallel to the plate surface of the liquid crystal cell, the liquid crystal cell has at least one contrast peak by tilting the optical compensation plate along with the first direction and the second direction respectively, and the tilt mechanism is configured to tilt the optical compensation plate toward a direction along with the first direction or the second direction, so as to have a contrast peak by smaller rotation angle from the optical compensation plate parallel to the plate surface of the liquid crystal cell.

5. The liquid crystal device of claim 4, wherein the axis of rotation is disposed in a plane of the optical compensation plate.

6. The liquid crystal device of claim 5, wherein the axis of rotation is disposed parallel to the plate surface of the liquid crystal cell.

7. The liquid crystal device according to claim 4, wherein the tilt mechanism is configured to tilt the optical compensation plate continuously in the first direction and the second direction to achieve substantial orthogonality between the second optical axis of the liquid crystal cell and the direction of the slow axis of the tilted optical compensation plate.

8. The liquid crystal device according to claim 4, wherein the tilt mechanism is configured to tilt the optical compensation plate within a limited angular range on opposite sides of an initial position of the optical compensation plate, to vary the direction of the slow axis within vicinities of +90° and −90° from the second optical axis, to thereby achieve substantial orthogonality between the second optical axis and the direction of the slow axis.

9. The liquid crystal device according to claim 8, wherein the limited angular range is from −5° to +5°.

10. The liquid crystal device according to claim 8, wherein the limited angular range is from −1° to +2°.

11. The liquid crystal device according to claim 1, wherein the optical compensation plate is rotatable, by the tilt mechanism, within a limited angular range.

12. The liquid crystal device according to claim 1, wherein the optical compensation plate is rotatable, by the tilt mechanism, only within a limited angular range of −1° to +2° on opposite sides of an initial position of the optical compensation plate.

13. The liquid crystal device according to claim 4, wherein the optical compensation plate is rotatable, by the tilt mechanism, only within a limited angular range.

14. The liquid crystal device according to claim 4, wherein the optical compensation plate is rotatable, by the tilt mechanism, only within a limited angular range of −1° to +2° on opposite sides of an initial position of the optical compensation plate.

* * * * *